United States Patent
Bergesio et al.

(10) Patent No.: US 12,398,760 B2
(45) Date of Patent: Aug. 26, 2025

(54) SEALING DEVICE FOR INSERTION BETWEEN TWO RELATIVELY ROTATING MEMBERS AND ASSOCIATED TRANSMISSION ASSEMBLY FOR VEHICLES

(71) Applicant: AKTIEBOLAGET SKF, Gothenburg (SE)

(72) Inventors: Davide Bergesio, Chieri (IT); Daniele Duch, San Gillio (IT); Marco Falossi, San Rafaele Cimena (IT)

(73) Assignee: AKTIEBOLAGET SKF, Gothenburg (SE)

( * ) Notice: Subject to any disclaimer, the term of this patent is extended or adjusted under 35 U.S.C. 154(b) by 477 days.

(21) Appl. No.: 17/859,633

(22) Filed: Jul. 7, 2022

(65) Prior Publication Data

US 2023/0017687 A1    Jan. 19, 2023

(30) Foreign Application Priority Data

Jul. 15, 2021    (IT) .......................... 102021000018635

(51) Int. Cl.
*F16C 33/78* (2006.01)
*F16D 3/84* (2006.01)

(52) U.S. Cl.
CPC .............. *F16C 33/7876* (2013.01); *F16D 3/84* (2013.01)

(58) Field of Classification Search
CPC .............. F16C 33/7876; F16C 33/7866; F16C 33/7883; F16C 33/782; F16C 33/7823;
(Continued)

(56) References Cited

U.S. PATENT DOCUMENTS 6,637,754 B1 * 10/2003 Ohtsuki .................. F16C 33/64
277/549
6,979,001 B2 * 12/2005 Ohtsuki ............... F16J 15/3264
277/572
(Continued)

FOREIGN PATENT DOCUMENTS

DE    102014206761 A1 * 10/2015 ............. B60B 27/02
DE    102010064672        10/2019
(Continued)

OTHER PUBLICATIONS

Search Report for corresponding Italy Patent Application No. 2021000018635 dated Mar. 18, 2022.

*Primary Examiner* — Nathan Cumar
(74) *Attorney, Agent, or Firm* — J-TEK LAW PLLC; Scott T. Wakeman; Mark A. Ussai

(57) ABSTRACT

A transmission assembly for vehicles, including a rolling bearing having a sealing device composed of a first annular screen coupled with a stationary outer ring of the bearing and a second annular screen coupled with a rotating inner ring of the bearing. Radially outer first and second L-shaped portions of the first and second screens project axially from the bearing and towards a constant velocity joint, the first L-shaped portion having a first and a second annular lip which form with the second L-shaped portion a radial sequence of labyrinth seals. A third annular sealing lip may be arranged radially downstream of the sequence of labyrinth seals and cooperates in sliding contact with the second screen. An encoder may be mounted on the second L-shaped portion and may have an annular overhang which forms with the first lip a first labyrinth seal.

11 Claims, 2 Drawing Sheets

(58) Field of Classification Search
CPC ....... F16C 33/805; F16D 3/84; F16J 15/3208; F16J 15/3232; F16J 15/4476
USPC ........................................................ 277/562
See application file for complete search history.

(56) References Cited

U.S. PATENT DOCUMENTS

| | | | |
|---|---|---|---|
| 9,261,144 B2* | 2/2016 | Duch | F16C 33/782 |
| 2004/0026867 A1* | 2/2004 | Adams | F16C 33/7813 |
| | | | 277/349 |
| 2011/0006485 A1* | 1/2011 | Nakagawa | F16J 15/32 |
| | | | 277/549 |
| 2011/0221140 A1* | 9/2011 | Nakagawa | F16J 15/3264 |
| | | | 277/412 |
| 2013/0127119 A1* | 5/2013 | Haepp | F16C 33/7889 |
| | | | 277/572 |
| 2014/0374996 A1* | 12/2014 | Duch | F16C 33/7883 |
| | | | 277/562 |
| 2014/0376848 A1* | 12/2014 | Duch | F16C 33/768 |
| | | | 384/448 |
| 2015/0097340 A1* | 4/2015 | Gulli | F16C 33/80 |
| | | | 277/349 |
| 2016/0347120 A1* | 12/2016 | Barberis | F16C 33/805 |
| 2018/0156278 A1* | 6/2018 | Albl | F16J 15/326 |

FOREIGN PATENT DOCUMENTS

| | | | |
|---|---|---|---|
| JP | 2016080141 | | 5/2016 |
| JP | 2016080141 A | * | 5/2016 |

* cited by examiner

SEALING DEVICE FOR INSERTION BETWEEN TWO RELATIVELY ROTATING MEMBERS AND ASSOCIATED TRANSMISSION ASSEMBLY FOR VEHICLES

CROSS-REFERENCE OF RELATED APPLICATIONS

This application is based on and claims priority to Italian Patent Application No. 102021000018635 filed on Jul. 15, 2021, under 35 U.S.C. § 119, the disclosure of which is incorporated by reference herein.

FIELD

The present disclosure relates to a sealing device designed to be inserted between two members in relative rotation so as to seal in a fluid-tight manner an annular cavity delimited by these members.

BACKGROUND

In wheel hubs, sealing assemblies are used to prevent the flow of external contaminants into an internal area of a bearing unit of a wheel hub unit for a vehicle.

BRIEF DESCRIPTION OF THE DRAWINGS

The disclosure will now be described with reference to the attached drawings which illustrate non-limiting exemplary embodiments thereof, in which.

DETAILED DESCRIPTION

Figure 1:
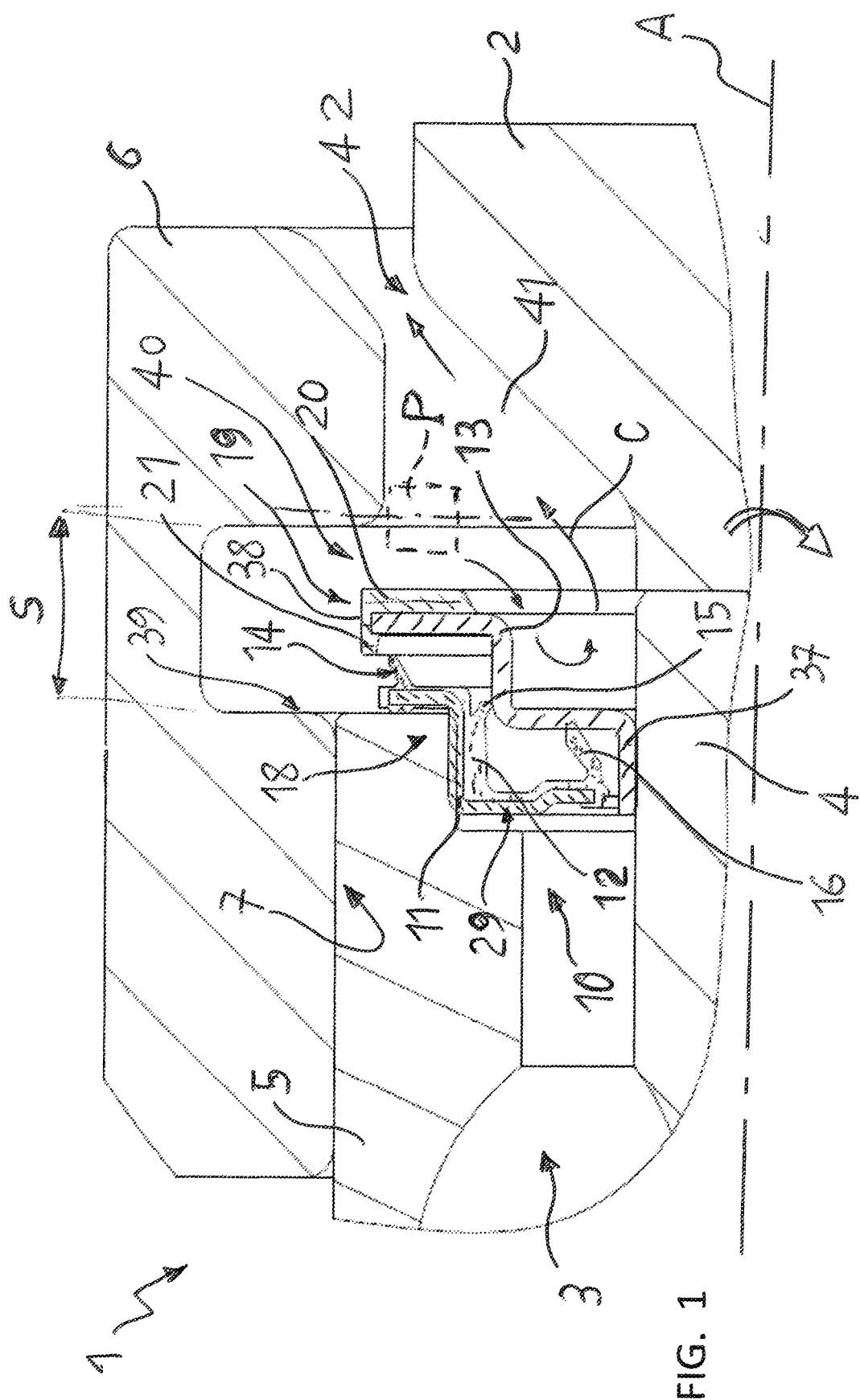
FIG. 1 illustrates a schematic, elevation view of a radial section of a transmission assembly for vehicles according to exemplary embodiments of this disclosure, with parts removed for simpler illustration or shown only partially.

Sealing devices for rolling bearings may be used in a vehicle wheel hub unit, between a radially inner ring, rotating during use, and a radially outer ring, stationary during use, of the wheel hub unit.

A transmission assembly for vehicles, typically a drive shaft for a vehicle driving wheel, may be provided with such a sealing device arranged on an inner or inboard side of the transmission assembly ("inboard" also being referred to by the abbreviation "IB").

In a vehicle transmission assembly, a constant velocity joint may be connected angularly integrally to a radially inner ring of a rolling bearing which is in turn connected to a driving wheel of the vehicle either directly, by a flanged end thereof opposite to the constant velocity joint, or indirectly by a flanged pin or shaft on which the inner ring of the rolling bearing may be mounted and which may be connected angularly integrally to the rotating part of the constant velocity joint. The inner ring is therefore rotating during use. The outer ring of the rolling bearing may be connected, directly or indirectly, to a suspension upright of a vehicle and is therefore stationary during use.

An annular cavity of a rolling bearing which houses the rolling bodies which make the inner ring rotatable with respect to the outer ring may be delimited between the inner ring and outer ring of the rolling bearing. A pair of sealing devices may be used to protect this annular cavity from the entry of external contaminants such as water, dust or mud. A first sealing device being arranged on the outer or outboard (OB) side of the vehicle, i.e. towards the wheel, and a second sealing device being arranged on the inboard side, i.e. towards the inside of the vehicle.

The sealing device arranged on the inboard side receives most of the external contaminants during the vehicle travel and therefore is that device which is the most subject to stress from the point of view of the hydraulic seal, which is usually formed by means of one or more sliding-contact annular lips. However, while high interference between the sliding-contact lip and respective sealing surface with which it slidingly cooperates is able to ensure an optimum hydraulic seal, on the other hand it increases the friction and therefore the energy consumption during travel of the vehicle, as well as the wear of the sliding-contact lip.

If contaminants reach the sliding-contact lip, they are stopped by the sliding-contact lip, but may also damage it, increasing the wear thereof in anomalous way.

An object of the present disclosure is to provide an improved sealing device which overcomes the drawbacks of the prior art, while being simple and low-cost to manufacture and compact in terms of overall dimensions.

A further object of the disclosure is to provide a transmission assembly for vehicles which has a high degree of reliability over a long period of time.

Based on the disclosure, therefore, a sealing device which can be inserted between two members in relative rotation, in particular between the inner and outer rings of a rolling bearing or a wheel hub unit, and a transmission assembly for vehicles provided with such a sealing device are provided.

Figure 3:
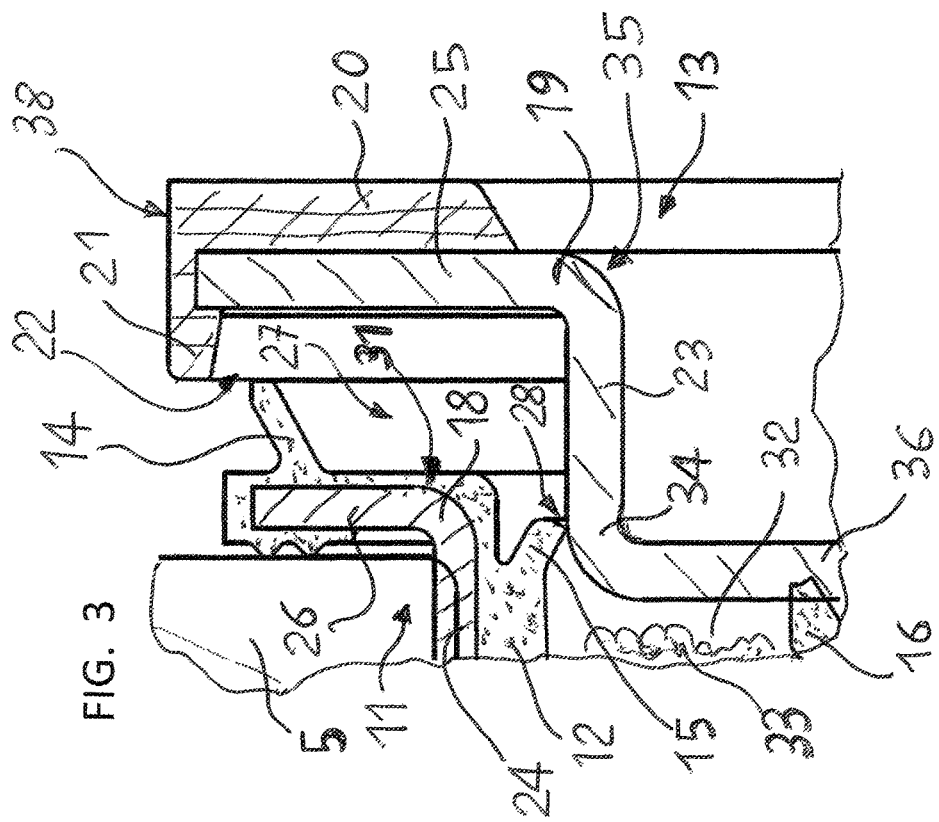
FIG. 3 illustrates a schematic, elevation view of a radial section in detail on an even larger scale of the sealing device according to exemplary embodiments of this disclosure.
Figure 2:
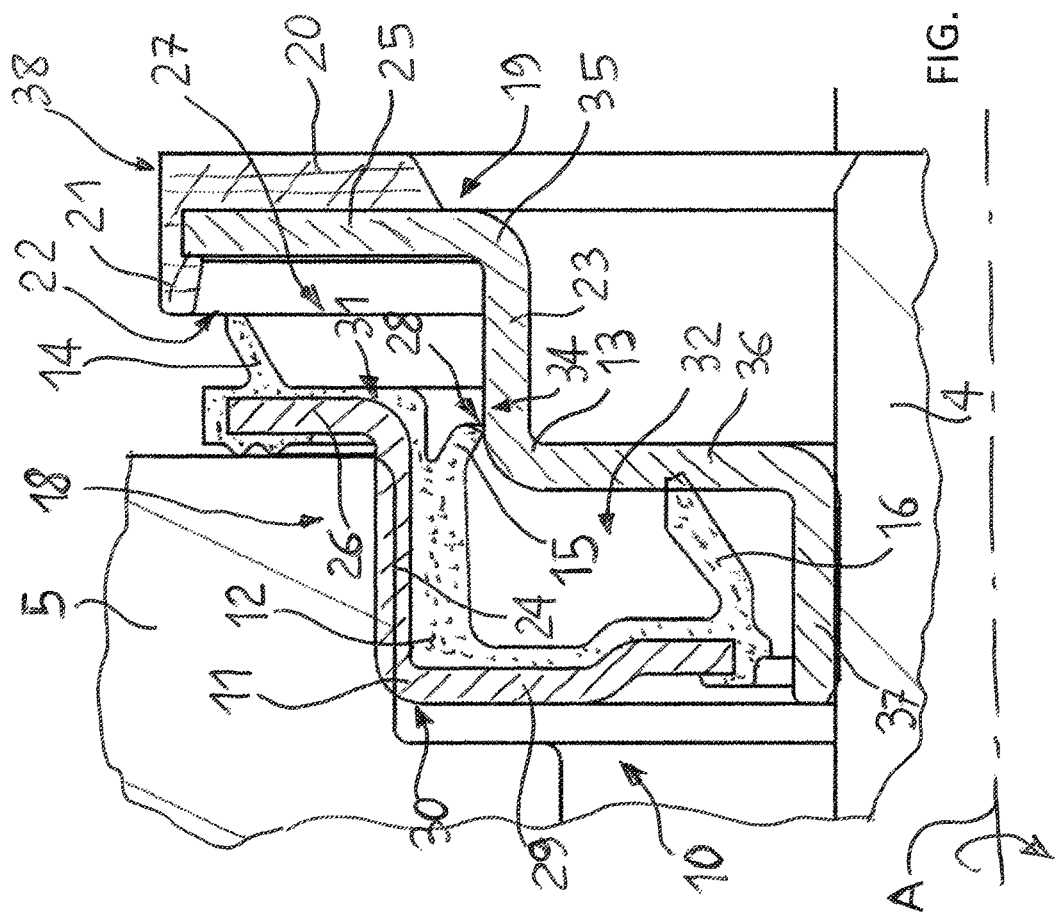
FIG. 2 illustrates a schematic, elevation view of a radial section in detail on a larger scale of the transmission assembly for vehicles according to FIG. 1 including the sealing device according to exemplary embodiments of this disclosure.

With reference to FIGS. 1 to 3, a transmission assembly 1 for vehicles may be configured to transmit mechanically a rotational movement to a vehicle wheel (not shown).

The transmission assembly 1 may include a constant velocity joint 2 and a rolling bearing and/or a wheel hub unit 3, which may include a radially inner ring 4 and a radially outer ring 5 which are coaxial with each other with respect to an axis A and rotate relative to each other about the axis A.

In particular, the inner ring 4 may be coupled annularly integrally, in a manner not shown for simplicity of illustration, together with the constant velocity joint 2, and the outer ring 5 may be stationarily coupled with a vehicle suspension upright 6, in this particular case inside or opposite an internal seat 7 of the suspension upright 6. Therefore, the inner ring 4 rotates during use about the axis A together with the constant velocity joint 2.

A sealing device 10 for protecting rolling bodies (not shown for simpler simplicity of illustration) which roll between the rings 4 and 5, so as to make them rotatable relative to each other during use, may be inserted between the inner ring 4 and outer ring 5.

Here and in the description below of various embodiments of the disclosure reference will be made to the inner and outer rings 4, 5 of a rolling bearing or a wheel hub unit 3, but the comments made will apply in an identical manner to any pair of concentric mechanical members which are in relative rotation.

The sealing device 10 according to the disclosure may be inserted between a first mechanical member 4 and a second mechanical member 5 in relative rotation, in particular between the rings 4, 5 of a rolling bearing of a wheel hub unit 3 forming part of the transmission assembly 1 for vehicles.

The sealing device 10 may include a substantially rigid first annular screen 11 coupled integrally as one piece with an elastomeric first annular element 12, and a substantially rigid second annular screen 13 arranged coaxially with the first screen 11 and facing the elastomeric first annular element 12.

The screens 11 and 13 may be made from a pressed and blanked metal sheet, for example made of steel, and the elastomeric annular element 12 may be co-molded onto the screen 11, to which it is fixed integrally as one piece (in the sense that it is inseparable therefrom, except by breakage) by vulcanization gluing.

The elastomeric annular element 12 may be provided with a plurality of annular sealing lips 14, 15 and 16, which extend axially and/or radially projecting from the first screen 11 and towards the second screen 13.

In various embodiments, the lips 14, 15 and 16 may be all arranged obliquely with respect to the axis A, with which they are concentric and coaxial, and therefore have both an axial and a radial development.

In the attached figures, the screens 11, 13, the rings 4,5 and the lips 14, 15 and 16 are shown not to scale in the un-deformed condition and, where they are shown superimposed on each other, this indicates that they are engaged together with interference.

In various embodiments, the screen 11 may be interference-fitted in the manner which will be seen radially on the inside of the outer ring 5, while the screen 13 may be interference-fitted in the manner radially on the outside of the inner ring 4. Similarly, the annular lip 16 may be a sliding-contact sealing lip, engaged with interference with the screen 13, while the lips 14, 15 may be labyrinth sealing lips 14, 15 which cooperate without making contact with the screen 13.

According to various embodiments, the first screen 11 may have a radially outer portion 18 thereof forming a first radially outer portion of the screen 11 which is L-shaped in radial cross-section and configured, so as to extend partly, during use, axially on the outside of the first mechanical member in relative rotation, in this particular case axially on the outside of the outer ring 5.

The second screen 13 may similarly have a radially outer portion 19 thereof forming a second radially outer portion of the screen 13, which is L-shaped in radial cross-section and arranged facing towards, and axially and radially spaced from, the first L-shaped portion 18.

The first L-shaped portion may be lined towards the screen 13 with the elastomeric element 12 and may have a first and a second annular sealing lip, 14 and 15 respectively, which cooperate without contact with the second L-shaped portion 19 to form with the same and between the first and second screens 11, 13, a radial sequence of labyrinth seals arranged in series with each other.

In various embodiments, the first screen 11 may also have the third annular sealing lip 16 which may be arranged radially on the inside of the sealing lips 14, 15 and of the said radial sequence of labyrinth seals formed by the same and which cooperates in sliding contact, with a predefined axial interference, with the second screen 13.

The annular sealing lips 14, 15 and 16 may be formed integrally as one piece with the elastomeric annular element 13 by a single pressing operation and using the same elastomeric material so as to be elastically deformable.

The second screen 13 may be provided integrally as one piece (this term being understood as having the meaning indicated above) and on the opposite side to the first screen 11, with a second elastomeric annular element 20 (which may also be made of a synthetic material which is not strictly elastomeric), configured to form a rotational speed signalling element or encoder, for example incorporating magnetizable or electrically conductive material and having along the annular rim discontinuous zones, for example formed by an alternation of peaks and/or valleys, magnetized or non-magnetized zones, or zones magnetized with opposite poles, etc. In any case, the annular element 20 may be configured to generate a signal by a sensor P (shown in broken lines) arranged with its axis perpendicular to the axis A.

According to various embodiments, the second elastomeric annular element 20 may also be provided, radially on the outside, with an annular overhang 21, which extends axially projecting from the second screen 13 and towards the first screen 11.

According to various embodiments, the first annular sealing lip 14 may be arranged radially on the outside of the second and third annular sealing lips 15 and 16 and extends projecting towards the annular overhang 21 with which it delimits a first annular gap 22 (FIGS. 2 and 3) between the first and second screens 11, 13 forming a first, radially outermost, labyrinth seal forming part of the said radial sequence of labyrinth seals arranged hydraulically in series.

The first annular sealing lip 14 may extend projecting towards the annular overhang 21 radially on the inside of the latter, so that the annular gap 22 forming the first labyrinth seal is a radial gap arranged radially on the inside of the overhang 21.

The radially outer L-shaped portion 19 of the second screen 13 includes (FIGS. 2 and 3) a first sleeve portion 23 arranged radially on the inside of, and radially and axially spaced from, a corresponding first sleeve portion 24 of the radially outer L-shaped portion 18 of the screen 11.

The L-shaped portion 19 may further include a first flange portion 25 which extends radially on the outside from the first sleeve portion 23 of the L-shaped portion 19 and which faces a corresponding first flange portion 26 of the L-shaped portion 18.

The annular element 20 and the corresponding annular overhang 21 may be mounted integrally on this flange portion 25 of the L-shaped portion 19, while the first and second annular sealing lips 14, 15 may be mounted, radially on the outside and radially on the inside, respectively, of the first flange portion 26 of the first L-shaped portion 18.

A first annular chamber 27 forming/constituting a radially intermediate second labyrinth seal, forming part of the said radial sequence of labyrinth seals arranged hydraulically in series, is defined/delimited between the first and second L-shaped portions 18 and 19 and the first and second annular sealing lips 14, 15.

The second annular lip 15 may extend projecting towards the first sleeve portion 23 of the L-shaped portion L19 so as to delimit therewith a second annular gap 28 between the first and second screens 11,13 forming/constituting a third labyrinth seal 28, which is radially innermost, of the said radial sequence of labyrinth seals arranged hydraulically in series.

The second lip 15 may extend projecting towards the first sleeve portion 23 of the L-shaped portion 19 radially on the outside of the latter, so that the annular gap 28 forming the third labyrinth seal is a radial gap, arranged radially on the outside of the sleeve portion 23.

In various embodiments, the radial gap 28 may have a radial amplitude smaller than that of the radial gap 22.

The sleeve portion 24 of the radially outer L-shaped portion 18 may be configured to be fitted during use angularly integral with the first member, in this particular case the stationary outer ring 5, so as to arrange during use the respective flange portion 26 of the L-shaped portion 18 axially on the outside of and flush with this first member, i.e. the outer ring 5.

The first screen 11 furthermore comprises (FIGS. 2 and 3) a second flange portion 29 which extends radially on the inside of the L-shaped portion 18, from a first end 30 of the sleeve portion 24, opposite to a second end 31 of the sleeve portion 24 from which the said flange portion 26 extends on the opposite side to the flange portion 29.

The second and third annular sealing lips 15 and 16 define between the first and second screens 11, 13, radially on the inside of the L-shaped portions 18 and 19 of the screens 11 and 13, a second annular chamber 32 arranged radially on the outside of the third annular lip 16 and configured to intercept any external contaminants C (indicated by the arrows in FIG. 1) which may pass by the first and second lips 14, 15.

This second annular chamber 32 may be advantageously filled with lubricating grease 33 (FIG. 3) in the case where this necessary or suitable.

In various embodiments, the radially outer L-shaped portion 19 of the screen 13 may be arranged axially on the outside of the first screen 11, displaced towards the constant velocity joint 2.

Radially on the inside of the L-shaped portion 19, extending from a first end 34 of the sleeve portion 23, opposite to a second end 35 of the said sleeve portion 23 from which the flange portion 25 extends radially outwards, the second screen 13 comprises a second flange portion 36 (FIGS. 2 and 3) arranged facing the corresponding second flange portion 29 of the first screen 11, radially on the inside of the L-shaped portion 18.

Still radially on the inside of the L-shaped portion 19 and radially on the inside of the flange portion 36, the second screen 13 further may include a second sleeve portion 37 (FIG. 2) parallel and opposite to the sleeve portion 23 and configured to be fitted during use angularly integral with the second relatively rotatable member, in this particular case the rotating inner ring 4, so as to arrange during use the second L-shaped portion 19 axially on the outside of the second member in relative rotation, i.e. of the inner ring 4.

In various embodiments, the transmission assembly 1 provided with the sealing device 10 described hitherto may have the second screen 13 which is integrally coupled with the rotating inner ring 4 and the first screen 11 which is integrally coupled with the stationary outer ring 5.

The first flange portion 26 of the radially outer L-shaped portion 18 of the screen 11 and the whole of the radially outer L-shaped portion 19 of the screen 13 may be arranged axially on the outside of the inner ring 4 so as to occupy part of an axial space S situated between the rolling bearing or wheel hub unit 3 and the constant velocity joint 2, so that a radially outer edge 38 of the annular element 20, may define a rotational speed signalling element or encoder, mounted on the flange portion 25 of the L-shaped portion 19 of the second screen 13 forms together with a radially inner side wall 39 of the seat 7 of the suspension upright 6 for the rolling bearing or wheel hub unit 3 a predefined axial gap 40 forming a labyrinth seal between the suspension upright 6 and the second screen 13.

This labyrinth seal 40 may be arranged radially upstream of the sequence of labyrinth seals 22, 27 and 28 arranged hydraulically in series and is the first labyrinth seal which is acted on during use by the external contaminants C.

Because this edge 40 rotates integrally with the inner ring 4, most of the contaminants C do not reach even the first labyrinth seal 22; any contaminants C which pass beyond the labyrinth seal 22 are collected inside the annular chamber 27 also because of the presence of the labyrinth seal 28 situated downstream thereof and are at least partly expelled from the chamber 27 owing to the rotation of the screen 13, so that the chamber 27 acts as a further labyrinth seal; the small amount of contaminants C which passes beyond even the chamber 27 and the labyrinth seal 28 does not however reach the sliding-contact lip 16 since it is blocked inside the chamber 32 so that the lip 16, which is the only sealing lip generating friction, is subject to limited wear and operates in an optimum manner and may be configured with minimum interference, so as to reduce the energy consumption and the wear while maintaining the same sealing efficiency in respect of the contaminants C.

Between the seat 7 of the suspension upright 6 and the constant velocity joint 2 there may also be defined an annular centrifuging chamber 41 (FIG. 1) for any external contaminants C, delimited internally by the second rotating screen 13 and provided on the opposite side to the second screen 13 with a radial annular gap 42 defined between the suspension upright 6 and the constant velocity joint 2 and configured to discharge externally the contaminants C; for example, by suitably forming the external shape of the constant velocity joint 2 it is possible to impart to the gap 42 a Venturi effect form which facilitates the expulsion of the contaminants C.

All objects of this invention are therefore achieved.

We claim:

1. A sealing device configured to be insertable between a first and a second member configured for relative rotation, the sealing device comprising:
   a substantially rigid first annular screen integrally coupled with a first elastomeric annular element; and
   a substantially rigid second annular screen arranged coaxially with the first screen and facing the first elastomeric annular element,
   wherein:
   the first screen comprises a first radially outer portion comprising a first L-shaped portion;
   the second screen comprises a second radially outer portion comprising a second L-shaped portion facing towards, and axially and radially spaced from, the first L-shaped portion;
   the first L-shaped portion comprises a first annular sealing lip and a second annular sealing lip, the first and second annular sealing lips cooperating without contact with the second L-shaped portion to form with the second L-shaped portion a radial sequence of labyrinth seals arranged hydraulically in series with each other between the first screen and the second screen;
   the first annular sealing lip is located entirely radially inward of a radially outer end of the second L-shaped portion; and
   the first screen comprises a third annular sealing lip, arranged radially inward of said first and second annular sealing lips and cooperating in sliding contact, with a predetermined axial interference, with the second screen.

2. The sealing device of claim 1, wherein,
the first, second and third annular sealing lips are formed integrally as one piece with the first elastomeric annular element;
the second screen is provided integrally as one piece with a second elastomeric or synthetic annular element configured to form a rotational speed signaling element or encoder, the rotational speed signaling element or encoder being located on a side of the second screen opposite the first screen,
the second elastomeric or synthetic annular element or encoder comprising an annular overhang extending axially from the second screen towards the first screen;
the first annular sealing lip being arranged radially outward of the second and third annular sealing lips and extending towards the annular overhang and delimiting with the annular overhang a first annular gap between said first and second screens to form a first labyrinth seal of said radial sequence of labyrinth seals, the first labyrinth seal being a radially outermost labyrinth seal of the radial sequence of labyrinth seals.

3. The sealing device of claim 2, wherein said first annular sealing lip extends towards a radially inner surface of the annular overhang.

4. The sealing device of claim 3, wherein,
the second L-shaped portion of the second screen includes:
a first sleeve portion arranged radially inside and radially and axially spaced from a first sleeve portion of the first L-shaped portion; and
a first flange portion extending radially outward from a first end of the first sleeve portion of the second L-shaped portion and facing a first flange portion of the first L-shaped portion;
the annular overhang is mounted on the first flange portion of the second L-shaped portion,
said first annular sealing lip is mounted radially outward of the first sleeve portion of the first L-shaped portion,
said second annular sealing lip is mounted radially inward of the first sleeve portion of the first L-shaped portion;
said first and second L-shaped portions and said first and second annular sealing lips defining a first annular chamber; and
the second annular sealing lip extends towards the first sleeve portion of the second L-shaped portion and defines with the first sleeve portion of the second L-shaped portion a second annular gap between said first and second screens.

5. The sealing device of claim 4, wherein said second annular sealing lip extends towards a radially outer surface of the first sleeve portion of the second L-shaped portion.

6. The sealing device of claim 5, wherein,
the first sleeve portion of the first L-shaped portion is configured to be fitted with the second member such that the first flange portion of the first L-shaped portion lies flush against an axially outer side of the second member; and
said first screen further comprises a second flange portion extending radially inward from a second end of the first sleeve portion of the first L-shaped portion opposite to the first end of the first sleeve portion of the first L-shaped portion.

7. The sealing device of claim 4,
wherein the second and third annular sealing lips and said first and second screens define a second annular chamber arranged radially inward of the first L-shaped portion of the first screen and radially outward of the third annular sealing lip, the second annular chamber being configured to intercept external contaminants that pass the first and second lips, said second annular chamber being configured to contain lubricating grease.

8. The sealing device of claim 6,
wherein the second and third annular sealing lips and said first and second screens define a second annular chamber arranged radially inward of the first L-shaped portion of the first screen and outward of the third annular sealing lip, the second annular chamber being configured to intercept external contaminants that pass the first and second lips, said second annular chamber being configured to contain lubricating grease.

9. The sealing device of claim 1, wherein the second L-shaped portion is arranged axially outward of the first screen.

10. The sealing device of claim 9, wherein,
the second screen comprises:
a second flange portion arranged facing a second flange portion of the first screen, the second flange portion of the first screen being located radially inward of the first L-shaped portion; and
a second sleeve portion, parallel to the first sleeve portion and configured to be fitted to the first member such that the second L-shaped portion is located axially outward of the second member.

11. A transmission assembly for vehicles comprising:
a rolling bearing or a wheel hub unit comprising:
a rotatable radially inner ring coupled integrally with a constant velocity joint; and
a stationary radially outer ring coupled with a vehicle suspension upright; and
a sealing device disposed on the constant velocity joint between the inner and outer rings,
the sealing device comprising:
a substantially rigid first annular screen integrally coupled with a first elastomeric annular element; and
a substantially rigid second annular screen arranged coaxially with the first screen and facing the first elastomeric annular element,
wherein:
the first screen comprises a first radially outer portion comprising a first L-shaped portion;
the second screen comprises a second radially outer portion comprising a second L-shaped portion facing towards, and axially and radially spaced from, the first L-shaped portion;
the first L-shaped portion comprises a first annular sealing lip and a second annular sealing lip, the first and second annular sealing lips cooperating without contact with the second L-shaped portion to form with the second L-shaped portion a radial sequence of labyrinth seals arranged hydraulically in series with each other between the first screen and the second screen;
the first annular sealing lip is located entirely radially inward of a radially outer end of the second L-shaped portion;
the first screen comprises a third annular sealing lip, arranged radially inward of said first and second annular sealing lips and cooperating in sliding contact, with a predetermined axial interference, with the second screen;
the second screen is coupled integrally with the rotatable inner ring and the first screen is coupled integrally with the stationary outer ring;
a first flange portion of said first L-shaped portion and a first flange portion of said second L-shaped portion are arranged axially adjacent to the outer ring and occupy part of an axial space between said rolling bearing or wheel hub unit and said constant velocity joint, a rotational speed signaling element or encoder, made of an elastomer or plastic, is mounted on a flange portion of the second L-shaped portion, the second screen forms a predefined axial gap with a radially inner side wall of a seat of the suspension upright for the rolling bearing or hub bearing unit;

said predefined axial gap forms a labyrinth seal between the suspension upright and the second screen and is arranged radially upstream of said sequence of labyrinth seals;

a centrifuging annular chamber is defined by said seat of the suspension upright and said constant velocity joint and the second screen and a radial annular gap is defined between the suspension upright and the constant velocity joint and configured for externally discharging contaminants from the centrifuging annular chamber.

* * * * *